W. A. DODGE.
FLEXIBLE PIPE CONNECTION.
APPLICATION FILED JAN. 16, 1915.
1,138,282.
Patented May 4, 1915.
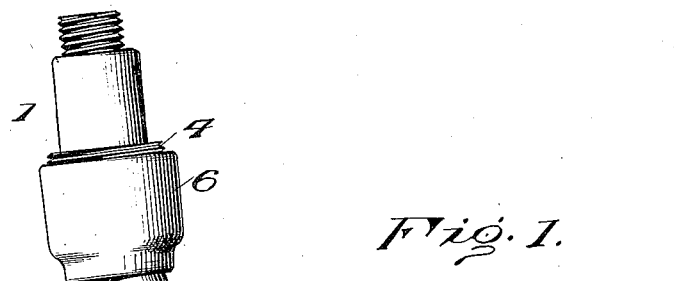
Fig. 1.
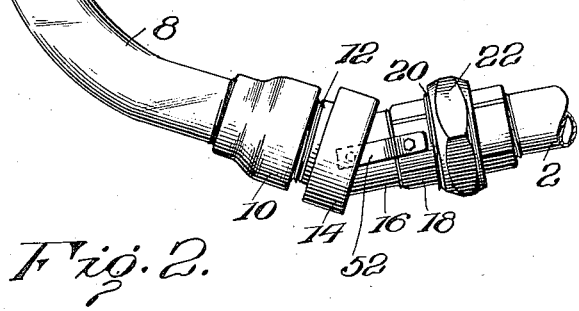
Fig. 2.
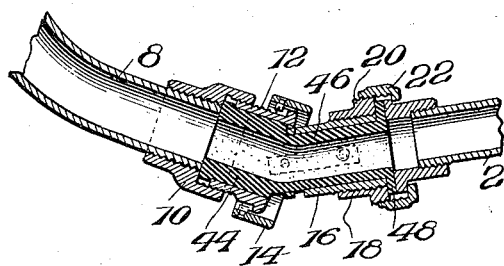
Fig. 3.
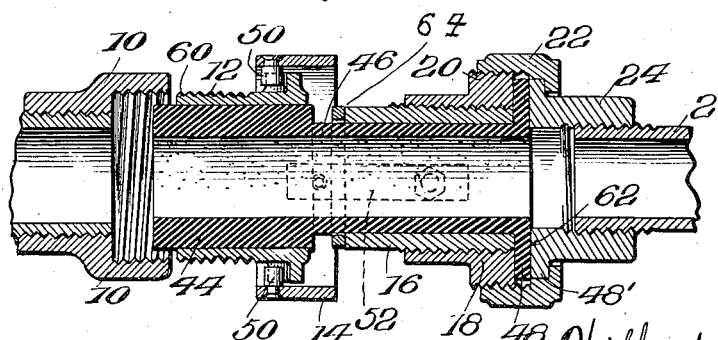
Witnesses
W. A. Williams
R. W. Brown
Inventor
Willard A Dodge
By Robertson & Johnson
Attorneys

UNITED STATES PATENT OFFICE.

WILLARD ALMOND DODGE, OF HORNELL, NEW YORK.

FLEXIBLE PIPE CONNECTION.

1,138,282.  Specification of Letters Patent.  Patented May 4, 1915.

Original application filed April 30, 1914, Serial No. 835,490. Divided and this application filed January 16, 1915. Serial No. 2,680.

*To all whom it may concern:*

Be it known that I, WILLARD A. DODGE, a citizen of the United States, and a resident of Hornell, in the county of Steuben and State of New York, have invented certain new and useful Improvements in Flexible Pipe Connections, of which the following is a specification.

This invention relates to improvements in flexible pipe connections of that character in which there are two or more metal sections connected together by a piece of hose of vulcanized rubber or other suitable material. A connection of this character is shown in my application, Ser. No. 835,490 filed April 30, 1914, of which this is a division.

The object of the invention is to so connect the metal members with the hose member that the hose will be both compressed and confined. In other words, in the preferable embodiment of my invention, the hose is of a longer length than the distance between the metal sections so that when the metal sections are secured together the hose will be shortened in length, thereby compressing the same.

The invention consists in the construction and arrangement hereinafter more particularly described and then definitely claimed.

In the drawings accompanying and forming part hereof: Figure 1 is a side elevation of a pipe connection made in accordance with my invention. Fig. 2 is a vertical central section showing the joint at its normal position. Fig. 3 is a similar section before the parts are screwed home.

Referring now to the details of the drawings by numerals: 1 and 2 designate the pipe connections to be connected by my flexible pipe connection. Nothing new is claimed in this application in the parts numbered 1, 4 and 6 for these are specifically claimed in my application, Ser. No. 835,490, filed April 30, 1914, of which this application is a division. The division claimed herein relates to the members connecting the pipe connection 2 with the pipe section 8. The pipe section 8 is provided with an enlarged socket member 10 which screws onto one section 12 of a universal joint, this section 12 being loosely connected to a second section 14 of the universal joint which in turn is connected to the third section 16 and 18 of the joint. The member 18 is screw threaded as indicated at 20 and screws into a ring nut 22 which forms a connection for a member 24 screwed onto the pipe connection 2. I have thus generally referred to the parts as illustrated in Fig. 1 and now refer to Figs. 2 and 3 for details of construction. As illustrated in these figures, the enlarged socket end 10 is arranged to receive an enlarged end 44 of a hose section, the other part 46 of which is formed of smaller external diameter and is provided with an annular flange 48. The socket member 10 is arranged to have screwed into it one section 12 of the universal joint, this section being pivotally connected to the second section 14 of the universal joint by means of the pivots 50 shown in Fig. 3. The second member 14 of the universal joint is connected by means of links 52 with the third section 18 of the universal joint, this section 18 being screwed into the ring nut 22 connected with the member 24 projecting from the pipe section 2, all as indicated in Fig. 3. The construction just described is such that before the parts are screwed home, the distance between the end 60 of the first universal joint member 12 and the wall 62 of the member 24 is considerably shorter than the length of the hose section 44 and 46 so that when the socket member 10 is screwed onto the member 12, the rubber hose section is thereby shortened to the extent that the socket member is screwed onto the member 12. Inasmuch as the member 46 of the hose section is the part most easily compressed, it follows that this part is compressed until the surplus space is entirely taken up. However, a ring 64 is located around the reduced part 46 of the hose section. This ring is preferably formed of brass, or softer material if preferred, the inner surfaces of which are slightly rounded as indicated in Fig. 3. This ring is for the purpose of partially filling the space between the shoulder of the member 16 and the section 12 of the universal joint and restrains the rubber hose section at this point when it is bent as illustrated in Fig. 2, and prevents the hose from bursting.

When the parts above referred to are screwed home, the space illustrated in Fig. 3 between the enlarged end of the hose 44 and the ring 64 is entirely closed so that the hose section 46 is considerably compressed. At the same time, it will be noticed that the compressed part of the hose 46 is likewise held confined laterally by means of the section 16 projecting from the member 18 of the universal joint.

It follows from the construction described and illustrated that when either member of the universal joint is moved, the hose section 46 of smaller diameter will accommodate the desired movement. The parts are shown in Fig. 2 as having been moved. Thus it is seen that the upper side of the hose section is still further compressed, while the under section is drawn out so that the space surrounded by the ring 64 is greatly increased. However, it is not increased sufficiently to relieve the hose section from compression but even when moved to the extreme extent shown in Fig. 2, there is no stretching of the parts of the hose section. Of course there would be a stretching at this point were it not for the fact that the hose section is so much decreased in length by being shortened as it is compressed into position. It will be evident that the ring 64 partially fills the space caused by the opening up of the joint and at the same time forms a circling band of metal to confine the hose and thereby prevent any tendency to burst.

From the foregoing and accompanying drawings it will be seen that I have provided a flexible pipe connection where two or more sections are connected together by a hose member which is confined laterally and compressed lengthwise thereof.

It is obvious that changes may be made in the form and construction of my invention without departing from the essential features thereof, the patentable points of which are set forth in the appended claims.

What I claim as my invention is:

1. In a pipe connection, two pipe sections connected by a universal joint, a hose section within said pipe sections and said universal joint and being of greater length, before insertion, than the space into which it is fitted, one pipe section having one member of said universal joint secured thereto and confining the hose section, a second member of the universal joint being pivotally connected to said first member, and a third member of the universal joint inclosing the other part of the hose section and connected to the other pipe section and being pivotally connected with the second member of the universal joint.

2. In a pipe connection, two pipe sections connected by a universal joint, a hose section within said pipe sections and said universal joint, said hose section having two parts of different diameters and being of greater length, before insertion, than the space into which it is fitted, one pipe section having one member of said universal joint secured thereto and confining the hose section, a second member of said universal joint being pivotally connected to said first member, and a third member of said joint inclosing the hose section of smaller diameter and connected to the other pipe section and being pivotally connected to the second member of the universal joint.

3. In a pipe connection, two pipe sections connected together by a universal joint, a hose section connecting said pipe sections within said universal joint, said hose section having two parts of different diameter, the larger part abutting against a shoulder in one pipe section and the smaller part having an annular flange abutting against a shoulder in the other pipe section, said hose section being of greater length, before insertion, than the space into which it is fitted.

4. In a pipe connection, two pipe sections, a hose section between said pipe sections, a universal joint connecting said pipe sections and confining said hose section at its central part, said hose section being of greater length, before insertion, than the space into which it is fitted.

In testimony whereof I affix my signature in presence of two witnesses.

WILLARD ALMOND DODGE.

Witnesses:
MYRON R. LAKE,
ELIZABETH V. WILCOX.